United States Patent Office 3,770,815
Patented Nov. 6, 1973

3,770,815
OIL-SOLUBLE PHOSPHONIC ACID COMPOSITION
Loyd W. Jones, Tulsa, Okla., assignor to Amoco Production Company, Tulsa, Okla.
No Drawing. Filed Apr. 14, 1969, Ser. No. 816,032
Int. Cl. C07f 9/38
U.S. Cl. 260—501.12     6 Claims

ABSTRACT OF THE DISCLOSURE

A solution of amino tri(lower alkyl phosphonic acid) in organic solvents is prepared by reacting an aqueous solution of the phosphonic acid with an oil-soluble amine having a hydrocarbon radical containing at least about ten carbon atoms, and dissolving the reaction product in a mixture of a substantially water-insoluble solvent, such as octanol, and a water-soluble solvent, such as methanol. Solubility of the amine phosphonate is increased by use of an amine salt of a carboxylic acid. The resulting solution is useful as a scale inhibitor, corrosion inhibitor, paraffin solvent and inhibitor, and acid retarder in oil wells. It has other uses outside the oil field.

---

Use of the amino phosphonic acids as scale inhibitors, sequestering agents, deflocculating agents, and the like, has been previously described in references, such as U.S. Pats. 2,599,807 Bersworth, 2,917,528 Ramsey et al., 3,234,124 Irani, 3,336,221 Ralston, 3,346,488 Lyons et al., and 3,393,150 Ralston. The water-soluble salts of the phosphonic acids may also be used. For example, U.S. Pat. 3,346,488 Lyons et al. describes the use of water-soluble amine salts of phosphonic acids in drilling fluids. Amino phosphonic acids and their salts, which are soluble in organic solvents, are described in U.S. Pat. 2,841,611 Bersworth. In these, however, the number of phosphonic acid groups per molecule, and hence the effectiveness of the compounds, has been reduced in the process of achieving a limited degree of solubility in organic solvents.

A highly effective amino phosphonic acid, which is soluble in organic solvents, is desirable. In particular, a substantially non-aqueous solution, which can be diluted with hydrocarbons is needed. Bersworth mentions use of such compositions as detergents, metal carriers, and as lubricating oil additives. Another important application is to the treatment of oil-bearing earth formations. An advantageous way of treating an oil well with a scale inhibitor, such as an amino phosphonic acid, is to squeeze the inhibitor back into the formation surrounding the well so that inhibitor will be produced slowly into the well with the scale-forming water. Sometimes, however, it is undesirable to squeeze a water solution into an oil-bearing formation. The formation may be water-sensitive so its permeability is greatly reduced by water, or even brine of a composition different from that naturally present in the formation. In such cases, it would be very desirable to squeeze a substantially non-aqueous solution of the inhibitor into the oil-bearing formation. At least a solution should be used that will not contact the formation with free water. The inhibitor would then slowly enter the well simultaneously with scale-forming water produced from other zones. An oil-soluble scale inhibitor, which would also inhibit corrosions by hydrogen sulfide, carbon dioxide, and low molecular-weight organic acids commonly found in oil wells, would obviously also be desirable.

An object of this invention is to provide an amino phosphonic acid in a form soluble in organic solvents. Another object is to provide a substantially non-aqueous solution of an amino phosphonic acid scale inhibitor for use in oil wells and in oil-bearing formations, surrounding such wells. Still another object is to provide an oil-soluble amino phosphonic acid scale inhibitor, which also inhibits corrosion by hydrogen sulfide, carbon dioxide, and low molecular-weight organic acids. Still other objects will be apparent from the following description and claims.

In general, I accomplish the objects of my invention by reacting an oil-soluble amine with the phosphonic acid. Due to some peculiarity of the phosphonic acids, the reaction product of an amine and a substantially anhydrous phosphonic acid is substantially insoluble in most solvents, both aqueous and non-aqueous. I have found, however, that the reaction product of an amine with an aqueous solution of certain phosphonic acids is soluble in a mixture of organic solvents, such as a mixture of an octanol and methanol. This solution is, in turn, soluble in other organic solvents which may even include hydrocarbons, such as kerosene. Solubility of the amine salt in liquid hydrocarbons, as well as in other organic solvents, can be increased by the addition of oil-soluble carboxylic acids. These acids also enhance the corrosion-inhibiting ability of the reaction products of amines with aqueous solutions of amino phosphonic acid.

The class of amino phosphonic acids usable in my composition is very limited. In water solutions, the amino phosphonic acids can be used as water-soluble salts of alkali metals, for example. In preparing substantially non-aqueous solutions, however, such metallic salts should be avoided. The metallic ion greatly complicates dissolving, in an organic solvent, the reaction product of the aqueous solution of the phosphonic acid and an oil-soluble amine. As previously noted, the amine phosphonate is sufficiently soluble in organic solvents only if the salt is formed between the amine and a water solution of the phosphonic acid. Since a metallic salt cannot be used, the phosphonic acids must be limited to those which are rather highly soluble in water in the free acid form. Only one such class is known to exist. This class is best described in U.S. Pat. 3,234,124 Irani. These amino phosphonic acids have the formula

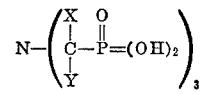

wherein X and Y represent hydrogen or a lower alkyl group. The class can be described as amino tri(lower alkyl phosphonic acid). The compound preferred because of its high water solubility is amino tri(methyl phosphonic acid). The high water solubility is important to permit use of as little water as possible to dissolve the acid and thus produce a composition which is as water-free as possible.

The minimum amount of water is a quantity sufficient to dissolve the phosphonic acid. It has been found that considerably more than this minimum amount should be used since an increased water content surprisingly increases the solubility of the amine salt in organic solvents. This apparently contradictory finding may be explained by the tendency of the highly polar phosphonic acid to be strongly solvated by water. Thus, the water is not present as free water, but is bound to the phosphonic acid by solvation forces. For the same reason, this water does not damage water-sensitive formations. Apparently, the amino tri(methyl phosphonic acid) dissolves in less water than can be held by solvation forces. The amine salt of the completely solvated phosphonic acid seems to be more soluble in organic solvents than the incompletely solvated acid salts. While this theory may explain the unusual behavior of the amine salts of the amino phosphonic acids, I do not, of course, wish to be bound by this theory.

Regardless of the theory, it has been found that if the phosphonic acid is amino tri(methyl phosphonic acid), the amount of water should be at least about half the weight of the acid if the amine salt is to form a clear solution in organic solvents at approximately room temperature. Preferably, the amount of water should be from about one to two times the weight of phosphonic acid. As much as four or five times as much water as phosphonic acid by weight may actually improve the solubility characteristics of the amine salt of the acid. As previously noted, most of this water is not free water, but is bound to the phosphonic acid by forces of solvation. The amine and any water-soluble alcohols, which may be used in the organic solvent system, may also hold some water by solvation forces. Amines can pull part of the water away from the acid leaving it incompletely solvated and thus may permit formation of polymers that are insoluble in the organic solvents. For various phosphonic acids, amines and solvents, these water-content values may change considerably, but should be near this general range.

The amine should be an oil-soluble amine of the type generally used in oil-soluble corrosion inhibitors. It should contain a hydrocarbon radical having at least about ten carbon atoms. This amine may be any of the types described, for example, in U.S. Pats. 2,468,163 Blair et al., 2,598,213 Blair, 2,736,658 Pfohl et al., 2,756,211 Jones, or the like. One of the most readily available and widely used amines is actually a mixture of amines having the formula

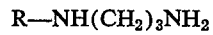

R—NH(CH$_2$)$_3$NH$_2$ in which R is a hydrocarbon radical. In the mixture, most of the amines have 16 or 18 carbon atoms in this hydrocarbon radical.

The amount of amine may be less than sufficient to neutralize completely the phosphonic acid. In order to give the phosphonic acid a desirable degree of solubility in organic solvents, however, the amount of amine should be at least about one-half that sufficient to neutralize the acid. Preferably, the amount of amine should be equal to at least about three-fourths that necessary to neutralize the phosphonic acid completely. It has been found that an excess of amine over that necessary to neutralize the acid is not harmful but actually further improves solubility of the salt in organic solvents. This may be due to the formation of a loose complex rather than a definite salt between the amine and the acid. The formation of such complexes of variable composition has been previously noted with high molecular-weight amines and carboxylic acids. The solubilizing action of the excess amine may also be simply because the excess amine is a good solvent for the amine salt. Whatever the explanation, excess amine is helpful but is rarely economically advisable due to the high cost of amines compared to many other organic solvents. The amount of amine necessary to neutralize the phosphonic acid should be determined by titrating the amine with a strong acid, such as hydrochloric acid of known reacting strength, and titrating the phosphonic acid with sodium hydroxide or other suitable base of standardized strength by the widely known methods used in analytical chemistry.

As previously noted, a further solubilizing action can be obtained by use of amine salts of carboxylic acids, such as those described, for example, in U.S. Pats. 2,756,- 211 Jones, 2,914,557 Oxford, 3,003,955 Jones, 3,061,553 Riggs, and the like. In general, the caboxylic acid should be one containing at least about six carbon atoms per molecule and preferably at least about 12, if it is to provide much solubilizing action for the amine phosphonates in organic solvents. One very desirable acid is a mixture of petroleum naphthenic acids boiling in the range from about 290° to about 300° F. at 2 millimeters of mercury pressure and having an average molecular weight of about 330. Another desirable example is a mixture of the dimeric and trimeric acids formed by polymerizing unsaturated fatty acids, such as linoleic and linolenic acids.

The amine used to form the salt or complex of the carboxylic acid should be selected from the same class used for forming the salts or complexes of the amino phosphonic acid. Preferably, the total amount of amine used is that which is just sufficient to neutralize the carboxylic acid and the phosphonic acid. As described above, excess amine acts as a very desirable solvent or solubilizing agent for the amine salts of amino phosphonic acids. Excess carboxylic acid has the same function. In view of the relatively low cost of some of the carboxylic acids, and their outstanding solubilizing action, it may be desirable in many cases to use a rather large amount of the carboxylic acid.

Another reason for using a rather high ratio of carboxylic acid to amino phosphonic acid is to improve the corrosion-inhibiting ability of the composition. The amine salts of the amino phosphonic acids have been tested as corrosion inhibitors and have been found to be good inhibitors for corrosion by hydrogen sulfide, carbon dioxide, and the other types of corrosion naturally occurring in oil wells, for example. However, most of the amine salts of carboxylic acids are better corrosion inhibitors than the amine salts of amino phosphoric acids. Therefore, use of at least some carboxylic acid is generally desirable to improve the corrosion-inhibiting abilities of the composition as well as to improve the solubility of the amine phosphonates in organic solvents.

A much lower concentration of the composition is required for inhibiting scale than is required for inhibiting corrosion. Therefore, it is usually best to include at least as much of the corrosion-inhibiting carboxylic acid as of the scale-inhibiting phosphonic acid. Preferably, much more carboxylic acid than phosphonic acid is used.

The amine salts of the amino phosphonic acids, when prepared in the presence of sufficient water to dissolve the acid, are soluble in many mixed solvents. The amount and nature of the solvent, which must be used to prepare a clear solution, varies widely, depending upon the water content of the salt, the specific amine and phosphonic acid which are used, and whether a carboxylic acid is used or not.

A mixed solvent system should be used. One part of this system is a substantially water-insoluble solvent, such as one of the octanols. This part dissolves, or is compatible with, the oil-soluble amine portion of the salt. The other most important part of the solvent is a water-soluble solvent, such as methanol. This part dissolves, or is compatible with, the water-solvated phosphonic acid portion of the salt. The water-insoluble and water-soluble parts of this binary solvent should be soluble in each other to form a clear, single-phase solution of the amine phosphonate.

The preferred class of water-insoluble solvents is made up of the high molecular-weight alcohols, such as the octanols, tridecyl alcohol, hexyl alcohol, hexyl Carbitol (mono hexyl ether of diethylene glycol), hexyl Cellosolve (2-hexoxy ethanol), nonyl phenol, or the like. Other classes of water-insoluble solvents, such as the ester, ketones, or the like, may be preferred in some cases. It is sometimes possible to use hydrocarbons, such as ordinary kerosene, as at least part of the water-insoluble solvent, particularly if the water content is high and if a carboxylic acid is included to increase the oil solubility of the amine phosphonate. Mixtures of water-insoluble solvents can be used in place of a single water-insoluble solvent.

The preferred class of water-soluble solvents is also made up of alcohols, such as methanol, ethanol, isopropanol, ethylene glycol, butyl Cellosolve (2-butoxy ethanol), and the like. Other classes, which can sometimes be used, include the very low molecular-weight esters, ketones, cyclic ethers, and the like. Methanol, isopropanol, and mixtures of these two, are ordinarily preferred because of their low cost.

One of the most successful of all the possible binary solvent systems for the amine phosphonates is about two parts by weight of an octanol and about one part by weight of methanol. Therefore, it is suggested that, when selecting an appropriate solvent system for a salt of any specific amine and phosphonic acid, this binary solvent system be used first as a standard to which variations can be compared to determine a more nearly optimum solvent for the particular salt. It is also advisable to start with a substantially neutral salt of the amine and acid containing about twice as much water as phosphonic acid. The amount of amine and water can then be adjusted to determine optimum contents.

At this point, it will be helpful to describe several examples.

EXAMPLE 1

A salt was formed between a beta diamine and amino tri(methyl phosphonic acid). The beta diamine had the formula $$R'CH(CH_3)NH(CH_2)_3NH_2$$

In this amine, the R' group was a saturated hydrocarbon radical. Actually, the material used was a mixture of amines having this formula but containing various lengths of hydrocarbon radicals, the average being about 13. The phosphonic acid was used in an aqueous solution containing approximately as much water by weight as acid. A binary solvent, made up of a branched octanol and methanol, was used. First, 42 grams of the amine were dissolved in 36 grams of the octyl alcohol. Then, 6 grams of the water solution of the phosphonic acid were dissolved in 6 grams of methanol. The amine solution was heated to 170° F. and the acid solution was stirred in. The two solutions blended easily to form a clear solution of the amine salt. Actually, a precipitate formed when the two solutions were mixed, but the solution cleared rapidly as the precipitate quickly dissolved.

Upon dilution of the solution with an aromatic petroleum fraction, the solution remained clear with up to five times as much of the petroleum fraction as of the solution. Further dilution resulted in a hazy solution. Dilution of one volume of solution with five volumes of isopropanol produced a precipitate. Dilution of the solution with a 50–50 mixture of the aromatic fraction and isopropanol produced clear solutions at all degrees of dilution. These dilution tests demonstrate the importance of maintaining a dual solvent made up of a water-soluble and a water-insoluble solvent. Too little of either produces solubility problems, particularly in the absence of carboxylic acids.

EXAMPLE 2

Another salt was prepared using the same amine, phosphonic acid solution, and solvents. In this case, 21 grams of the amine were dissolved in 15 grams of octanol, and 6 grams of the water solution of the acid were dissolved in 6 grams of methanol. Again, the amine solution was heated, this time to 160° F. and the acid solution was stirred in. The two solutions blended easily to form a clear solution as soon as the precipitate dissolved. The solution remained clear upon dilution to any extent with the 50–50 mixture of aromatic petroleum fraction and isopropanol.

EXAMPLE 3

A third salt was prepared using the same amine, phosphonic acid solution, and solvents, but in this case using insufficient amine to neutralize the phosphonic acid. A slightly different mixing procedure was also used. In this case, 6 grams of the amine were dissolved in 10 grams of octanol and 5 grams of methanol. Five grams of the acid solution were then blended into this mixture without preheating. The resulting solution was cloudy. Upon being heated to about 150° F., however, the solution became clear. The resulting solution remained clear with all degress of dilution with the 50–50 mixture of isopropanol and aromatic petroleum fraction.

Compositions of the three preparations described above are summarized in Table I. Amounts of ingredients in all tables are given in percent by weight to facilitate comparison.

TABLE I

| Example | I | II | III |
|---|---|---|---|
| Ingredients: | | | |
| Phosphonic acid | 3.3 | 6.2 | 9.6 |
| Reacted amine | 9.6 | 17.9 | 23.1 |
| Unreacted amine | 37.1 | 25.9 | 0.0 |
| Water | 3.3 | 6.2 | 9.6 |
| Octanol | 40.0 | 31.8 | 38.5 |
| Methanol | 6.7 | 12.5 | 19.2 |
| Total | 100.0 | 100.0 | 100.0 |

It should not be concluded from Table I that wide variations in amine-to-acid ratios are possible with wide variations in octanol-to-methanol ratios. The ratios of solvents and the amount of mixed solvent had to be correlated with the amine-to-acid ratio and concentrations of these ingredients in order to form clear solutions. The example preparations simply illustrate that, by forming an oil-soluble amine salt of the phosphonic acids dissolved in sufficient water, a clear solution can be produced in organic solvents by a few tests with a dual solvent made up of a water-soluble organic solvent and a water-insoluble organic solvent.

The abilities of three compositions in Table I to inhibit sulfate scale deposition was determined in the following test:

A solution of calcium chloride and a solution of sodium sulfate were mixed together. The concentrations of calcium chloride and sodium sulfate were sufficient to provide the equivalent of 6,000 parts per million by weight of calcium sulfate in supersaturated solution. Sodium chloride was also formed. Additional sodium chloride was dissolved in the sodium sulfate solution before mixing with the calcium chloride solution to bring the sodium chloride concentration in the final mixture up to 25,000 parts per million by weight. The solutions were mixed at room temperature, the scale inhibitors were added, and 200 milliliters of the inhibited solution were placed in a 300-milliliter tall-form beaker. The beaker was then placed in a hot water bath at 165° F. The solution came up to 165° F. in about 15 minutes, after which the beaker was allowed to remain in the bath for three hours. The precipitate was then filtered from the solution, dried and weighed. Comparison to a control sample run without inhibitor permitted calculating the percent of scale inhibition.

Through an error, the concentrations tested were only five parts per million of the total compositions. As a result, the actual concentration of phosphonic acid in the solution containing the composition of Example 1 was only 0.165 part per million. Results of the tests are presented in Table II.

TABLE II

| Composition | Concentration, p.p.m. | Inhibition, percent |
|---|---|---|
| Example: | | |
| 1 | 0.165 | 0.0 |
| 2 | 0.310 | 34.8 |
| 3 | 0.480 | 97.7 |

It will be noted that as little as one-half part per million of the phosphonic acid in the form of the amine salt was effective to inhibit sulfate-scale deposition. Obviously, the amine salt is a highly effective scale inhibitor.

The ability of the amine salts of Examples 1 and 3 to inhibit hydrogen sulfide corrosion was tested in the standard, static bottle test. In this test, 900 milliliters of air-free 5-percent sodium chloride brine, containing about 500 parts per million of hydrogen sulfide, are placed in a 1-liter flask. On top of the brine are placed 100 milliliters of oil containing the inhibitor. The concentration of inhibitor is based on total liquid, not on just the oil. A tared 1-inch square pre-weighed steel coupon, suspended on a glass rod, is lowered through the oil into the brine. A 10-second residence time of the coupon in the oil phase is allowed to permit the formation of a corrosion-inhibiting film. The bottle is stoppered and the coupon is left suspended in the brine for seven days. It is then removed, cleaned and re-weighed. Tests are run in duplicate and compared to duplicate controls which permit calculation of percent inhibition. Results of the tests are presented in Table III.

TABLE III

| Composition | Concentration, p.p.m. | Inhibition, percent |
|---|---|---|
| Example: | | |
| 1 | 25 | 93.9 |
| 1 | 50 | 94.2 |
| 3 | 25 | 94.4 |
| 3 | 50 | 93.9 |

The coupon surfaces were mildly pitted, so the compositions are, obviously, not quite as good as amine salts of carboxylic acids for inhibiting hydrogen sulfide corrosion. It is also obvious, however, that the amine phosphonates are capable of acting in the dual capacity of scale and corrosion inhibitors.

EXAMPLE 4

Another salt was made using another amine. This amine had the formula $$R-NH(CH_2)_3NH_2$$

This was also a mixture of amines in which R represented the saturated and unsaturated hydrocarbon radicals naturally present in the acid portion of the glyceride esters of soybean oil.

The acid was amino tri(methyl phosphonic acid) and was used in a water solution containing as much water by weight as phosphonic acid. The amine was first dissolved in octanol before mixing with the aqueous-acid solution. The resulting mixture had the composition shown in Table IV. This composition was a thick paste. The paste was soluble in mixed solvent as explained in Examples 5, 6, and 7.

EXAMPLE 5

Ten grams of the composition of Table 4 were mixed with 5 grams of octanol. A slurry of undissolved solids in liquid resulted. The liquid phase separated into two layers.

EXAMPLE 6

Ten grams of the composition of Example 4 were mixed with 5 grams of methanol. It is to be noted that the composition of Example 4 already contained about 25-percent of octanol. Addition of the methanol, therefore, provided a dual solvent containing about twice as much methanol as octanol. A slurry of undissolved solids in a single-phase liquid resulted.

EXAMPLE 7

The compositions of Examples 5 and 6 were mixed resulting in a clear solution. This preparation contained approximately twice as much octanol as methanol.

The compositions of the various preparations are presented in Table IV.

TABLE IV

| Example | 4 | 5 | 6 | 7 |
|---|---|---|---|---|
| Ingredients: | | | | |
| Phosphonic acid | 15.4 | 10.3 | 10.3 | 10.3 |
| Reacted amine | 44.6 | 29.7 | 29.7 | 29.7 |
| Unreacted amine | 0.0 | 0.0 | 0.0 | 0.0 |
| Water | 15.4 | 10.3 | 10.3 | 10.3 |
| Octanol | 24.6 | 16.4 | 49.7 | 33.0 |
| Methanol | 0.0 | 33.3 | 0.0 | 16.7 |
| Total | 100.0 | 100.0 | 100.0 | 100.0 |
| Type solution | Paste | Slurry | Slurry | Clear |

The data in Table IV illustrate the difficulty of dissolving the amine phosphonate in single solvents, or even in mixed solvents, where the ratio of water-soluble to water-insoluble organic solvents is not in a range suitable for the particular salt to be dissolved. The composition of Example 7 shows that, by adjusting the ratio of solvents, a clear solution can be formed containing as much as 40 percent by weight of the salt.

EXAMPLE 8

It should be noted that when the composition of Example 7 was cooled to 30° F., some precipitation from solution took place. In an effort to overcome this difficulty, the amount of water was increased, kerosene was substituted for part of the octanol, and, most important of all, an amine salt of naphthenic acids was added. Isopropyl alcohol was also substituted for methanol. The exact composition is presented in Table V following Example 10.

EXAMPLE 9

For comparison to the composition of Example 8, a composition was prepared which contained the same amounts of water, octanol, kerosene, and isopropyl alcohol but omitted the naphthenic acids. The composition and properties are reported in Table V.

EXAMPLE 10

A third composition containing the solvents of Example 8 but containing less naphthenic acids was prepared. The exact composition and properties are presented in Table V.

TABLE V

| Example | 8 | 9 | 10 |
|---|---|---|---|
| Ingredients: | | | |
| Phosphonic acid | 2.3 | 7.7 | 3.5 |
| Naphthenic acid | 14.2 | 0.0 | 10.8 |
| Reacted amine | 13.5 | 22.3 | 15.7 |
| Unreacted amine | 0.0 | 0.0 | 0.0 |
| Water | 10.0 | 10.0 | 10.0 |
| Octanol | 10.0 | 10.0 | 10.0 |
| Kerosene | 30.0 | 30.0 | 30.0 |
| Isopropanol | 20.0 | 20.0 | 20.0 |
| Total | 100.0 | 100.0 | 100.0 |
| Type solution at— | | | |
| 75° F | Clear | Paste | Clear |
| 30° F | Clear | (¹) | (¹) |

¹ Separation.

The data in Table V show how a solvent satisfactory for one salt system is not suitable for another, even though the only change is substitution of naphthenic acid for phosphonic acid. The amine was almost exactly neutralized in all cases. The data show the ability of the carboxylic acids to improve the solubilization of the amine phosphonates in organic solvents. The amine salts of the carboxylic acids might even be considered part of the solvent system for the amine phosphonates. The ratio of water to phosphonic acid in Example 8 is very high. Use of so much water, unless absolutely necessary, is not advisable to avoid the danger of unbound water being present. In many applications, of course, the presence of unbound water is unobjectionable. In such cases, however, it is ordinarily best to use an aqueous solution of the phosphonic acid. My preparations are intended for use where a composition is required which is substantially free from unbound water. Therefore, more than about five times as much water as phosphonic acid should not ordinarily be used.

EXAMPLE 11

Using amino tri(methyl phosphonic acid) and the amine described in Example 4, an approximately neutral amine salt was formed using less water with phosphonic acid. Only half as much water as phosphonic acid was used. Even this small amount of water was able to form a clear solution of the phosphonic acid. The solvent used for the amine salt was a mixture of an octanol and methanol. This mixture formed a clear solution of the amine salt. The exact composition and properties are given in Table VI following Example 13.

EXAMPLE 12

Using the same acid, amine, water-to-acid ratio and solvents as in Example 11, an amine-salt solution was formed. In this case, however, an amine salt of naphthenic acids was substituted for part of the mixed solvent. Considering the substitution in another way, it might be said that the naphthenic acid salt was used as a part of the solvent. The amine used in forming the naphthenic-acid salt was the same as used for forming the phosphonic-acid salt. The composition and results are shown in Table VI.

EXAMPLE 13

Preparation of the composition of Example 12 was repeated, except for the use of a different ratio of octanol to methanol. The composition and properties are shown in Table VI.

TABLE VI

| Example | 11 | 12 | 13 |
|---|---|---|---|
| Ingredients: | | | |
| Phosphonic acid | 3.0 | 3.0 | 3.0 |
| Naphthenic acid | 0.0 | 18.3 | 18.3 |
| Amine | 8.7 | 17.4 | 17.4 |
| Water | 1.5 | 1.5 | 1.5 |
| Octanol | 57.9 | 39.9 | 44.9 |
| Methanol | 28.9 | 19.9 | 14.9 |
| Total | 100.0 | 100.0 | 100.0 |
| Type solution at— | | | |
| 120° F | Clear | Clear | Clear |
| 75° F | Clear | Clear | Clear |
| 30° F | (¹) | Clear | Clear |

¹ Precipitate.

Table VI shows two important things. First, a salt soluble in organic solvents can be formed using as little as one-half as much water as phosphonic acid to form the phosphonic acid solution. Second, use of an amine salt of a carboxylic acid increases the solubility of the amine phosphonate sufficiently to prevent the formation of a precipitate at 30° F. A comparison of the compositions and properties of Examples 12 and 13 shows that the ratio of water-soluble to water-insoluble solvents can be varied considerably in the presence of the amine salt of a carboxylic acid. The high ratio of carboxylic to phosphonic acid in Examples 12 and 13 makes these preparations particularly suitable for performing the dual function of inhibiting scale and corrosion. The very low water content removes all danger of unbound water adversely affecting water-sensitive earth formations, thus making the preparations usable in all formations.

EXAMPLE 14

An approximately neutral salt was formed by reacting amino tri(methylphosphonic acid) and a nearly pure dodecyl amine. The acid was dissolved in an equal weight of water before the salt was formed. The salt was successfully dissolved in mixed octanol and methanol at room temperature, but the solution solidified when cooled to 30° F. The composition and properties are presented in Table VII following Example 15.

EXAMPLE 15

A salt was prepared as in Example 14 but containing a substantially neutral naphthenic acid salt of the same amine. The composition and properties of a solution of these salts in mixed octanol and methanol are given in Table VII.

TABLE VII

| Example | 14 | 15 |
|---|---|---|
| Ingredients: | | |
| Phosphonic acid | 9.9 | 3.0 |
| Naphthenic Acid | 0.0 | 18.5 |
| Amine | 30.1 | 18.5 |
| Water | 9.9 | 3.0 |
| Octanol | 33.4 | 38.0 |
| Methanol | 16.7 | 19.0 |
| Total | 100.0 | 100.0 |
| Type solution at— | | |
| 120° F | Clear | Clear |
| 75° F | Clear | Clear |
| 30° F | (¹) | (²) |

¹ Solid (formed quickly)
² Solid (formed slowly)

Data in Table VII show that clear solutions in organic solvents can be prepared using a pure monoamine to form the phosphonic acid salt. The data also show that high pour point which results when such amines are used. The carboxylic acid salt helped to delay solidification but was unable to prevent eventual solidification at 30° F.

In the examples presented above, several mixing procedures are described. It is possible to mix the amino phosphonic acid solution and the amine to form an amine salt containing water. This material is usually a very thick paste which can then be dissolved in a suitable mixed solvent. My invention in its simplest form contemplates the formation of this reaction product between the amine and the water solution of the phosphonic acid in the absence of other ingredients. Even if the reaction product is to be shipped long distances, however, the difficulty of handling and dissolving the paste is generally sufficient to make advisable mixing the paste with a little solvent to form a composition which is easier to handle and dissolve.

If a solvent is to be used with the salt, it is usually best to dilute either the amine or the phosphonic acid solution with the solvent before mixing the amine and the acid. If the solvent is water-insoluble, it should be used to dilute the amine. If water-soluble, the solvent should be used to dilute the acid solution. If a dual solvent is used, the amine should be diluted with the water-insoluble portion while the acid solution is diluted with the water-soluble portion, the two diluted materials then being mixed.

Regardless of how the ingredients are mixed, a solid reaction product often results which separates from the liquid and is difficult to dissolve in the solvents, even though enough mixed solvent is present and the temperature is sufficiently high to provide a clear solution eventually. It has been found that solution of any precipitate which forms can be greatly accelerated by heating the solution. A temperature of about 120° F. is usually adequate, although temperatures as high as about 170° F. have been successfully used. If precipitation takes place due to cooling a solution to a low temperature, it is often necessary to heat the slurry to re-dissolve the precipitate in a reasonable length of time.

Use of the organic solvent solutions in scale inhibiting and corrosion inhibiting have been stressed. Possible use to remove paraffin and inhibit paraffin deposition have also been mentioned. Many other applications of the composition are possible. For example, the phosphonates have dispersing abilities, so they can be used to remove finely divided solids from formation pores. As a matter of fact, one of the principal reasons for developing the oil-soluble phosphonates was to disperse organic particles. There has been some evidence of this action in the field. However, the other actions of the composition have also been important and have been much easier to demonstrate, so these other actions have been emphasized.

The solutions of amine salts of the amino phosphonic acids in organic solvents have also been found to be useful in well-acidizing operations. Tests have shown that if some formations are treated with an oil solution of the amine salt before acidizing, the rate of reaction of the acid on the formation is reduced by more than 50 percent. This permits the acid to penetrate the formation to a greater distance from the well before reacting with the formation. The salts also perform their usual cleaning and solids peptization action. In addition, as the salts return to the well after the acidizing job, these salts prevent scale formation and corrosion.

Other applications include use as detergents, metal carriers, and the like, in lubricating oils, as mentioned in U.S. Pat. 2,841,611 Bersworth. Use for similar purposes in fuel oils or other oil products is also possible. Still other applications will be apparent to those skilled in the various arts.

The compositions are intended principally for use in oil wells to inhibit scale and corrosion. In this application, an organic solvent solution of the amine salts of phosphonic and carboxylic acids, containing from about 2 to about 10 percent by weight of the total composition, is squeezed into the formation. Before this solution is used, any scale which is present in the well should be removed. This may be done chemically by the use of acids or other chemicals, or the scale may be removed mechanically as by scrapers, string shots of explosives, or the like. The amine phosphonates have considerable dispersing abilities but not enough to disperse hard scale.

After the cleaning operation, the solution of amine phosphonate is injected. If the history of the well indicates deposition of paraffin or other organic solvents may have occurred, a solution containing only about 1 percent by weight of the amine salts of phosphonic and carboxylic acids is used in an amount equal to at least about 1 barrel (42 U.S. gallons per barrel) per foot of treated formation. The solvent in such cases should be an aromatic fraction of petroleum or other solvent for paraffin. If paraffin or other organic solvent deposition is not a problem, then about a 5 or 10 percent solution of the amine salts in an organic solvent should be used.

Finally, an overflush of oil or other suitable liquid should be injected to force the treating solution back away from the well. The volume of the overflush should usually be about the volume of the treating solution plus an extra volume, such as about a hundred barrels. The well is then produced, whereupon the amine salt returns slowly to the well to inhibit corrosion and the deposition of scale and paraffin.

Many alternates and variations are described above by way of example. Others will occur to those skilled in the art. Therefore, I do not wish to be limited to these examples, but only by the following claims.

I claim:

1. A composition containing a phosphonate in a form dispersible in organic solvents to form clear solutions, said composition comprising the reaction product of an amine having the following structural formula $$R-NH(CH_2)_3NH_2$$

in which the substituent R is a member selected from the group consisting of the mixture of saturated and unsaturated hydrocarbon radicals present in the acid portion of the glyceride esters of soy bean oil, and the radical $$R'CH(CH_3)-$$

wherein R' represents a mixture of saturated hydrocarbon radicals averaging about 13 carbon atoms; and an amino tri (lower alkyline phosphonic acid) having the structural formula

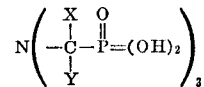

wherein X and Y are members selected from the group consisting of hydrogen and a lower alkyl group, said amine being present in an amount sufficient to neutralize at least about one-half the acid and said water being present in an amount sufficient to dissolve said phosphonic acid before its reaction with said mixture but said water being present in an amount less than about five times the weight of said acid.

2. The composition of claim 1 in which said acid is amino tri (methyl phosphonic acid), and said amine is present in an amount at least about three-fourths that necessary to neutralize said acid and said water is from about one-half to about two times the weight of said acid.

3. The composition of claim 1 in which the amine employed has the following structural formula $$R-NH(CH_2)_3NH_2$$

wherein the substituent R represents the mixture of saturated and unsaturated hydrocarbon radicals present in the acid portion of the glyceride esters of soy bean oil.

4. The composition of claim 1 in which the substituent R represents $$R'CH(CH_3)-$$

wherein R' represents a mixture of saturated hydrocarbon radicals averaging about 13 carbon atoms.

5. The composition of claim 3 in which said acid is amino tri (methyl phosphonic acid), and said amine is present in an amount at least about three-fourths that necessary to neutralize said acid and said water is from about one-half to about two times the weight of said acid.

6. The composition of claim 4 in which said acid is amino tri (methyl phosphonic acid), and said amine is present in an amount at least about three-fourths that necessary to neutralize said acid and said water is from about one-half to about two times the weight of said acid.

References Cited

UNITED STATES PATENTS

| | | | |
|---|---|---|---|
| 3,298,956 | 11/1967 | Iran et al. | 260—501.12 |
| 3,336,221 | 8/1967 | Ralston | 260—502.5 |
| 3,346,488 | 10/1967 | Lyons et al. | 260—502.5 |

HOWARD T. MARS, Primary Examiner

M. W. GLYNN, Assistant Examiner

U.S. Cl. X.R.

252—8.55 B, 8.55 E, 364, 398